Aug. 11, 1959  H. E. BRITT  2,898,934
DUMP VALVE
Filed Nov. 5, 1956  2 Sheets-Sheet 1
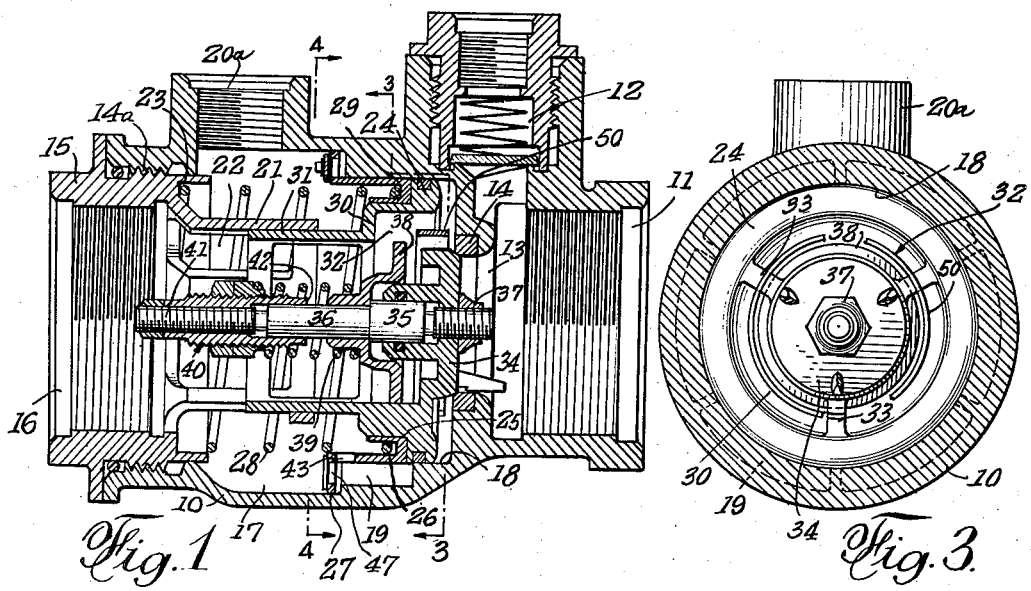
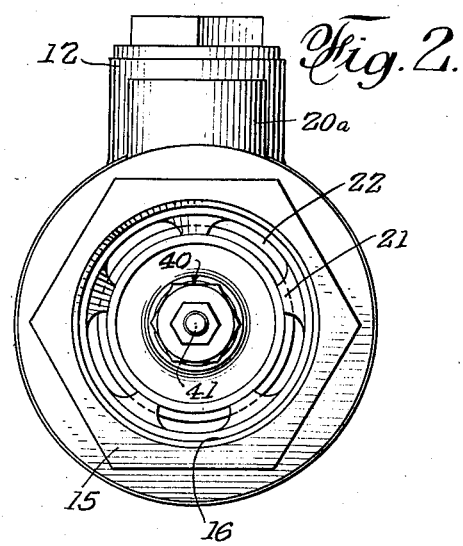
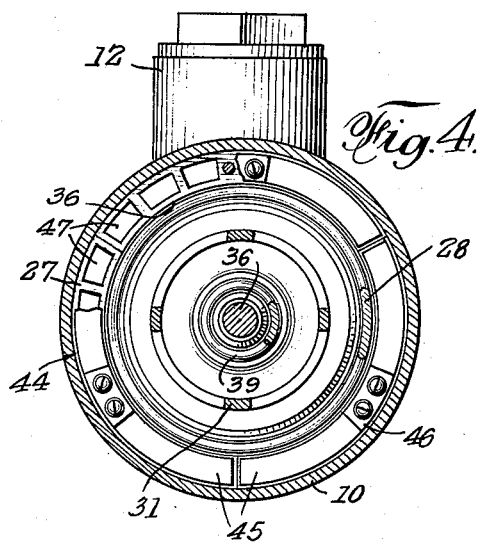
INVENTOR.
HERBERT E. BRITT
BY C. G. Stratton
ATTORNEY

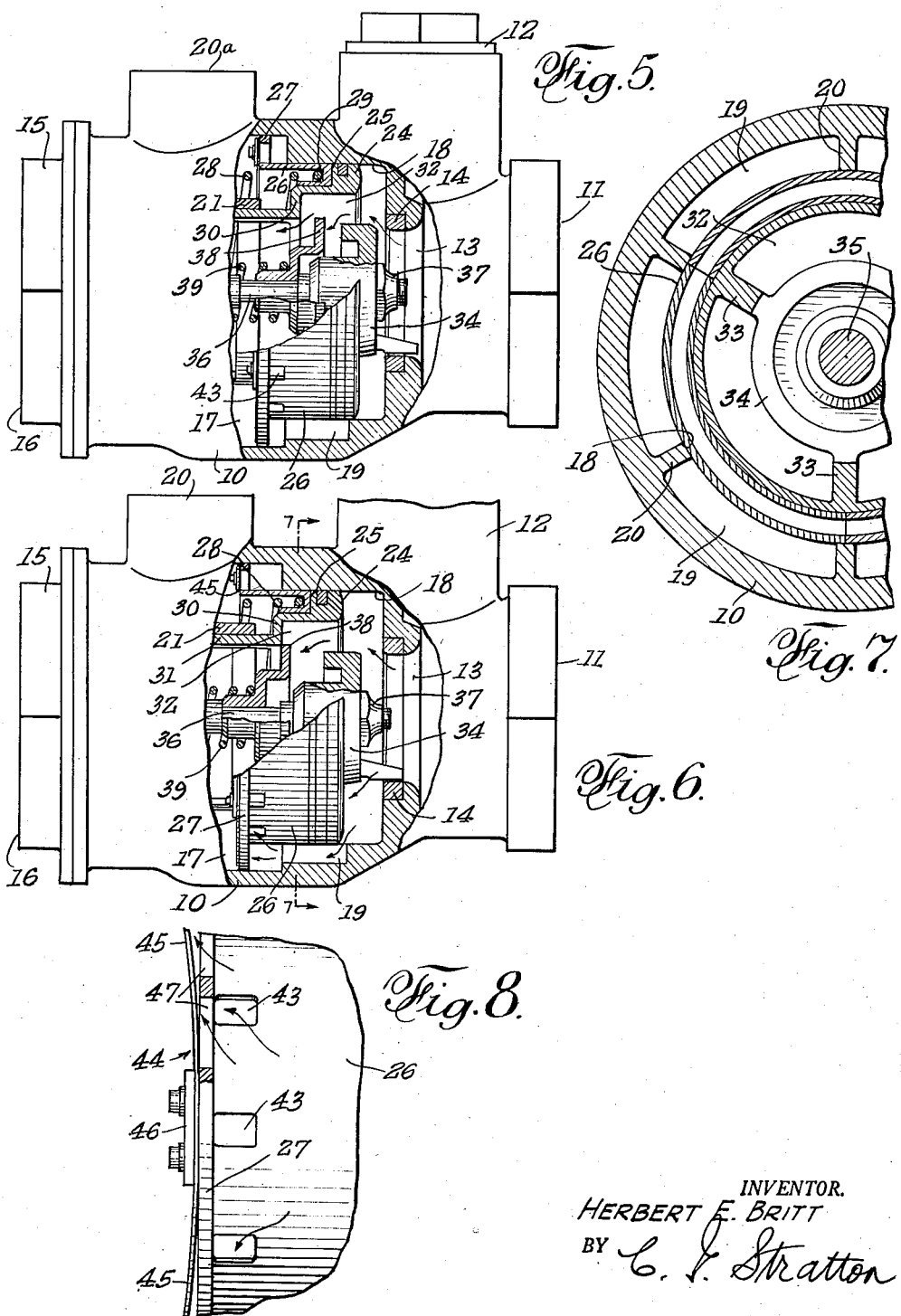

United States Patent Office 2,898,934
Patented Aug. 11, 1959

2,898,934

DUMP VALVE

Herbert E. Britt, Los Angeles, Calif., assignor to Air Products Co., Los Angeles, Calif., a partnership Application November 5, 1956, Serial No. 620,248

5 Claims. (Cl. 137—512.1)

This invention relates to a valve to control flow of a fluid, particularly a liquid, but the same may be adapted to gases as well.

It is an object of the present invention to provide a valve that will prevent all flow of a fluid up to a predetermined pressure differential, and then, when the pressure tends to increase above said pressure differential, will crack or open and allow the fluid to pass or escape through the valve, and then, if the upstream supply of fluid increases, the valve will continue to open at a proportional rate so as to maintain a pressure drop through the valve at or near the said pressure differential.

Another object of the present invention is to provide a valve that will assume full open or dump position when the flow, during the normally open position, exceeds a predetermined minimum.

Another object of the invention is to provide a valve as characterized above that opens to full dump position with a relatively low pressure drop, thereby enabling quick emptying of a line, tank, or other receptacle under critical and small pressure differential.

A further object of the invention is to provide a valve of the character referred to that is highly sensitive to changes of pressure as induced by minimal changes in the rate of flow through the valve.

The present valve is of such construction that when the flow has reached a predetermined flow rate, as, for instance, five gallons per minute, the same, according to adjustment, shuttles or opens to a large orifice position (the dump position) which maintains a nearly constant low pressure differential which is usually set much lower than the "cracking" pressure, such as a pressure differential of five p.s.i.

An important feature of the present valve is that the orifice or orifices thereof are controlled in such a way that the low pressure drop in the dump position is maintained at or near the same value regardless of increase of flow up to the maximum capacity for which the valve is designed. An example capacity of twenty-five gallons per minute may be used for illustration. Maximum capacity is roughly a function of the overall size of the valve and/or of the relative size of its various components. The basic design of the present valve makes possible a much lighter and smaller valve in proportion to its overall performance than is possible with other types of dump valves and is of extreme value, particularly for aircraft and similar fields of use.

When the valve is in the dump position and the flow is reduced to below a value predetermined by adjustment, the valve will automatically reset to the cracking pressure. The flow at which the valve will reset may be more, nearly the same, or less than the flow at which the valve goes into the dump position. For example, the valve will be assumed adjusted to reset when the flow is reduced to six gallons per minute or below five gallons per minute if the flow had not exceeded six gallons per minute, if it was set to dump at five gallons per minute. This is an unusual and valuable function of the present valve for certain types of hydraulic circuit requirements.

If the valve is set to dump at five gallons per minute and reset at two gallons per minute, for instance, the valve follows a simple pattern of dumping at five gallons per minute. And, if the flow increases up to twenty-five gallons per minute the pressure differential remains at five p.s.i plus or minus, with only a small deviation such as one-quarter p.s.i. As the flow is reduced, the pressure differential will remain in the described approximate five p.s.i range, until reaching two gallons per minute, then the same will shuttle or reset to maintain a cracking pressure of twenty p.s.i., for example. Then, as the flow is further reduced the valve completely closes and remains closed until the pressure differential again increases beyond cracking pressure.

From the foregoing, it follows that the present valve, among its many indicated uses as a dump valve, is particularly useful to control the output of a hydraulic pump, especially of the positive displacement type. Placed in the suction line of such a pump, the valve herein contemplated will crack at a predetermined cracking pressure, and will hunt, dump and close, all as hereinabove indicated.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 1 is a longitudinal sectional view of a dump valve according to the present invention, the same being shown closed.

Fig. 2 is an end view of the discharge side of the valve.

Figs. 3 and 4 are vertical cross-sectional views as taken on the respective lines 3—3 and 4—4 of Fig. 1.

Fig. 5 is a side elevational view, partly in section, showing said valve in its normal open position.

Fig. 6 is a similar view showing the valve in dump position.

Fig. 7 is a broken and enlarged cross-sectional view as taken on line 7—7 of Fig. 6.

Fig. 8 is a further enlarged and fragmentary side view of one of the elements of the valve, showing the position assumed when dumping.

The valve that is illustrated is enclosed in a body 10 that has an inlet 11 at one end, the same being in communication with a check valve that is optionally provided to by-pass a portion of the inlet flow before the same reaches a valve opening 13 that is defined by a valve seat 14. The opposite end of the body 10 is provided with internal threads 14a to threadedly receive an outlet fitting 15 having an outlet 16.

Between the valve seat 14 and the outlet 16, the body 10 is formed to have an interior cylinder chamber 17 and, between said chamber and the valve seat, there is provided a smaller cylinder 18 that is concentric with said chamber 17 and the valve seat. The end of cylinder 18 that is adjacent to chamber 17 is provided with a circumferentially arranged set of pockets 19 that are defined between radial ribs or lands 20. An auxiliary outlet 20a, extending laterally from the cylinder chamber 17, may be optionally provided.

The mentioned fitting 15 is formed as a separate part only for purpose of assembly of the valve and, since the same is fixed in assembly, it constitutes a part of the valve body. As shown best in Figs. 1 and 2, said fitting 15 is provided with a cage 21 that extends concentrically into chamber 17, the openings 22 in said cage enabling liquid flow from said chamber 17 into and through the outlet 16. Said fitting, around the case, is provided with an annular spring abutment 23.

The cylinder 18 is fitted with a piston 24 which is formed with an annular recess 25 on the outlet side and into which is fitted a three-part extension 26 of said piston, said extension being provided with an outturned flange 27 that constitutes a piston fitting the cylinder chamber 17. The three-part form of extension 26 is necessary to enable assembly thereof in chamber 17 through the small passage afforded by the threaded opening 14a. The piston 24 is biased in a direction toward the inlet 11 by an expansion spring 28 which is disposed between the mentioned fixed abutment 23 and an annular abutment 29 formed in extension 26.

Said piston 24 is formed as an annulus that has a flange 30 on the outlet side and a tubular cage extension 31 that telescopically fits into the cage 21. An internal flow chamber 32 is defined by said piston 24 and one or more radial ribs or fins 33 extend from the piston through the latter chamber and connect with a valve disc 34 that is operatively associated with valve seat 14 on the outlet side thereof. Thus, valve 34 opens with pressure according to the loading of spring 28.

Valve disc 34 has its axis on the axial center of the cylinders 17 and 18 and the same is threadedly connected to a stem 35 from which a pilot 36 extends toward the outlet side of the valve. Said stem is affixed to the valve by means of a lock nut 37.

Rearward of the valve disc 34 and slidably mounted on the pilot 36, there is provided an auxiliary piston 38 that is of diametral size to pass through the cage 31 with a minimum of clearance. Said piston 38 resides in flow chamber 32 and is biased in a direction toward the inlet by a spring 39, the tension of which may be adjusted by the means 40 carried by a threaded extension 41 of pilot 36. Said means 40 includes an abutment 42 to limit the retractive movement of the auxiliary piston 38 under pressure of the flow in the valve.

The piston extension 26 is provided with ports 43 that allow flow between pockets 19 and chamber 17, and the same are preferably located adjacent flange 27, as shown. Additional flow between said pockets and chamber is afforded by means 44 (Figs. 4 and 8) carried by flange 27. Said means is shown as outwardly flexible masking plates 45 made of thin spring material and clamped over the outlet side of said flange by clamp plates 46. Said masking plates normally close ports or openings 47 in said flange and open said openings, as shown in Fig. 8, when the inlet pressure is great enough to flex the plates in the manner shown.

While the valve may be designed to operate under different pressure conditions, providing the pressure drop or differential is maintained low between different rates of flow, the operation may be more clearly understood by using exemplary pressures and rates of flow. The same will be given in the following description of the operation.

Until 20 pounds per square inch is reached in the inlet 11, the valve 34 will remain seated on valve seat 14 and the valve is closed to flow. When this pressure is reached, the same, acting on the inlet faces of valve 34 and piston 24 and against the bias of spring 28, cracks the valve, establishing a minimal flow through the valve. Asssuming this flow to be less than two gallons a minute, the inlet pressure remains substantially constant at 20 p.s.i. This condition is shown in Fig. 5 and is maintained as long as the pressure induced by the two gallon per minute flow is ineffective to cause the auxiliary piston 38 to move against its biasing spring 39.

When the flow exceeds two gallons per minute, the pressure on the inlet side of auxiliary piston 38 causes said piston to move against the bias of spring 39 until the same substantially closes the entry of the flow into cage 31. Hence, the total pressure of the increased flow, as can be seen from Fig. 6, becomes effective to move the piston 24 until the same uncovers the pockets 19.

Since the sum of the areas of pistons 24 and 38 is now subject to said increased flow, the same move bodily as above indicated, to open pockets 19 to the inlet flow. Since ports 43 communicate said pockets with the chamber 17 and the telescoping cages 21 and 31 allow free flow from said chamber to the outlet, the dumping of the flow is accomplished at a low pressure drop. Thus, from the example given, when the flow increases beyond the minimal mentioned, it may be as great as twenty-five gallons per minute and yet the pressure drop may not exceed five p.s.i.

This low drop may be maintained during dumping flow, if the flow becomes so great as to crowd the ports 43, by automatic opening of ports 47. As the pressure tends to build up in pockets 19, spring plates 45 will be flexed to open said ports 47 and thereby increase the dumping capacity of the valve. Under such conditions, the valve is fully open to dump at a low pressure drop.

When the flow reduces below the maximum, first the ports 47 will close; then, as the flow reduces further, the reverse movement of the pistons 24 and 38 takes place until, when the flow is reduced to below two gallons per minute, the flow is stopped by closing of the inlet which will remain closed until the inlet pressure builds up to twenty p.s.i., in which case, the valve cracks, as before stated.

In order to minimize turbulences in the initial inlet flow past valve seat 14 and which cause an undesired pressure drop in the fluid acting on piston 38, a deflector ring 50 is preferably provided, as best seen in Figs. 1 and 3. Said ring is impinged by the inlet flow and the latter is thereby deflected toward the outer face of piston 38 before passing outwardly of cage 31.

While the foregoing has illustrated and described what is now contemplated to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. A dump valve comprising a spring-biased piston responsive to inlet pressure, a disc-controlled valve seat open to inlet flow upon movement of the piston in response to such pressure, an auxiliary spring-biased piston concentric with the first piston and on the outlet side of the valve seat and responsive to inlet pressure when said seat is open, the first piston having a flow-passing cage, the auxiliary piston substantially closing said cage to flow when responding to inlet pressure, a cylinder in which the first piston is movable, an enlarged pressure-receiving annulus on the first piston and receptive of the pressure of the flow in the outlet passages, the first piston being provided with outlet ports in communication with said outlet passages, said annulus being provided with flow-passing ports, and pressure-responsive resilient means normally closing said latter ports and opening to outlet flow under pressure in said latter ports.

2. In a dump valve having an inlet and a flow-passing opening on the outlet side of said inlet, a valve disc controlling said flow, a piston integral and concentric with the valve disc, a flow chamber being defined between said disc and piston, an auxiliary piston disposed in said chamber, independent biasing means on the piston and on the auxiliary piston to yieldingly resist movement of said piston under force of inlet flow impinging on the valve disc and the two pistons, said first piston having a flow-passing cage, the auxiliary piston substantially closing said cage to flow when moving in response to inlet pressure, a cylinder in which said first piston is movable, and outlet passages in said cylinder and open to inlet flow upon movement of the first piston in response to inlet pressure.

3. In a dump valve having an inlet and a flow-passing opening on the outlet side of said inlet, a valve disc controlling said flow, a piston integral and concentric with the valve disc, a flow chamber being defined between said disc and piston, an auxiliary piston disposed in said chamber, independent biasing means on the piston and on the auxiliary piston to yieldingly resist movement of said piston under force of inlet flow impinging on the valve disc and the two pistons, said first piston having a flow-passing cage, the auxiliary piston substantially closing said cage to flow when moving in response to inlet pressure, a cylinder in which said first piston is movable, outlet passages in said cylinder and open to inlet flow upon movement of the first piston in response to inlet pressure, and an enlarged pressure-receiving annulus on the first piston and receptive of the pressure of the flow in the outlet passages.

4. In a dump valve having an inlet and a flow-passing opening on the outlet side of said inlet, a valve disc controlling said flow, a piston integral and concentric with the valve disc, a flow chamber being defined between said disc and piston, an auxiliary piston disposed in said chamber, independent biasing means on the piston and on the auxiliary piston to yieldingly resist movement of said piston under force of inlet flow impinging on the valve disc and the two pistons, said first piston having a flow-passing cage, the auxiliary piston substantially closing said cage to flow when moving in response to inlet pressure, a cylinder in which said first piston is movable, outlet passages in said cylinder and open to inlet flow upon movement of the first piston in response to inlet pressure, and an enlarged pressure-receiving annulus on the first piston and receptive of the pressure of the flow in the outlet passages, the first piston being provided with outlet ports in communication with said outlet passages.

5. In a dump valve having an inlet and a flow-passing opening on the outlet side of said inlet, a valve disc controlling said flow, a piston integral and concentric with the valve disc, a flow chamber being defined between said disc and piston, an auxiliary piston disposed in said chamber, independent biasing means on the piston and on the auxiliary piston to yieldingly resist movement of said piston under force of inlet flow impinging on the valve disc and the two pistons, said first piston having a flow-passing cage, the auxiliary piston substantially closing said cage to flow when moving in response to inlet pressure, a cylinder in which said first piston is movable, outlet passages in said cylinder and open to inlet flow upon movement of the first piston in response to inlet pressure, an enlarged pressure-receiving annulus on the first piston and receptive of the pressure of the flow in the outlet passages, the first piston being provided with outlet ports in communication with said outlet passages, said annulus being provided with flow-passing ports, and pressure-responsive resilient means normally closing said latter ports and opening to outlet flow under pressure in said latter ports.

References Cited in the file of this patent
UNITED STATES PATENTS

| | | |
|---|---|---|
| 773,641 | Hayden | Nov. 1, 1904 |
| 1,262,641 | Cockburn | Apr. 16, 1918 |